United States Patent [19]
West

[11] 3,890,562
[45] June 17, 1975

[54] REGULATED POWER SUPPLY UTILIZING A HALFWAVE SWITCH

[75] Inventor: Thomas G. West, Fort Wayne, Ind.

[73] Assignee: General Electric Company, Indianapolis, Ind.

[22] Filed: Jan. 25, 1974

[21] Appl. No.: 436,560

Related U.S. Application Data

[63] Continuation of Ser. No. 305,715, Nov. 13, 1972, abandoned.

[52] U.S. Cl. ............... 323/14; 315/194; 315/206; 315/241 R; 315/247; 315/311; 315/DIG. 7; 307/252 T; 307/252 UA; 321/18; 323/102
[51] Int. Cl. .................. G05f 1/64; H02p 13/24
[58] Field of Search ............. 323/24, 22 SC, 102; 315/218, 208, 240, 241 R, 311, 194, 206, 247, 273, 274, 225, DIG. 7, DIG. 5; 321/18; 307/252 N, 252 T, 252 UA; 13/27

[56] References Cited
UNITED STATES PATENTS

| | | | |
|---|---|---|---|
| 1,839,802 | 1/1932 | Northrup | 13/27 |
| 1,852,215 | 4/1932 | Northrup | 13/27 |
| 3,484,623 | 12/1969 | Cain | 323/240 X |
| 3,536,955 | 10/1970 | Sturdevant et al. | 315/241 R |
| 3,646,423 | 2/1972 | Tatematsu et al. | 321/18 X |
| 3,662,216 | 5/1972 | Hildebrant | 323/24 X |
| 3,701,937 | 10/1972 | Combs | 323/21 |
| 3,780,347 | 12/1973 | Reisland | 315/247 X |
| 3,781,595 | 12/1973 | Samuels | 315/247 X |

OTHER PUBLICATIONS

IBM Tech. Disc. Bulletin, Vol. 15, No. 3, Aug. 1972, pg. 734.

*Primary Examiner*—Gerald Goldberg

[57] ABSTRACT

A regulated power supply for a xenon flash tube utilizing a triac as a voltage regulating device and output capacitors as energy storage devices is disclosed. The triac is controlled by a zero voltage crossover AC trigger which is connected to the gate of the triac. The zero voltage crossover AC trigger senses the voltage across the triac and fires the triac at or near zero voltage crossover for preselected half cycles. The triac comes on at the beginning of a half cycle and stays on until it commutates off at the end of the half cycle. This firing of the triac allows the output capacitors to charge to a desired energy level. Flashing, and thus discharge of the capacitor through the tube, will occur only after application of a starting pulse from a starting circuit which is connected to the tube. An output circuit comprising the output storage capacitors and an output voltage sensing means is also provided. A step-up transformer is connected between the triac and the output circuit. A power factor improvement capacitor is connected across the primary winding of the transformer and an extension winding. A voltage comparator is connected between the output voltage sensing means and the zero voltage crossover AC trigger. The comparator compares the output voltage to a reference voltage, and when the output voltage falls below the reference voltage, a signal is passed to the zero voltage crossover AC trigger which in turn fires the triac.

4 Claims, 1 Drawing Figure

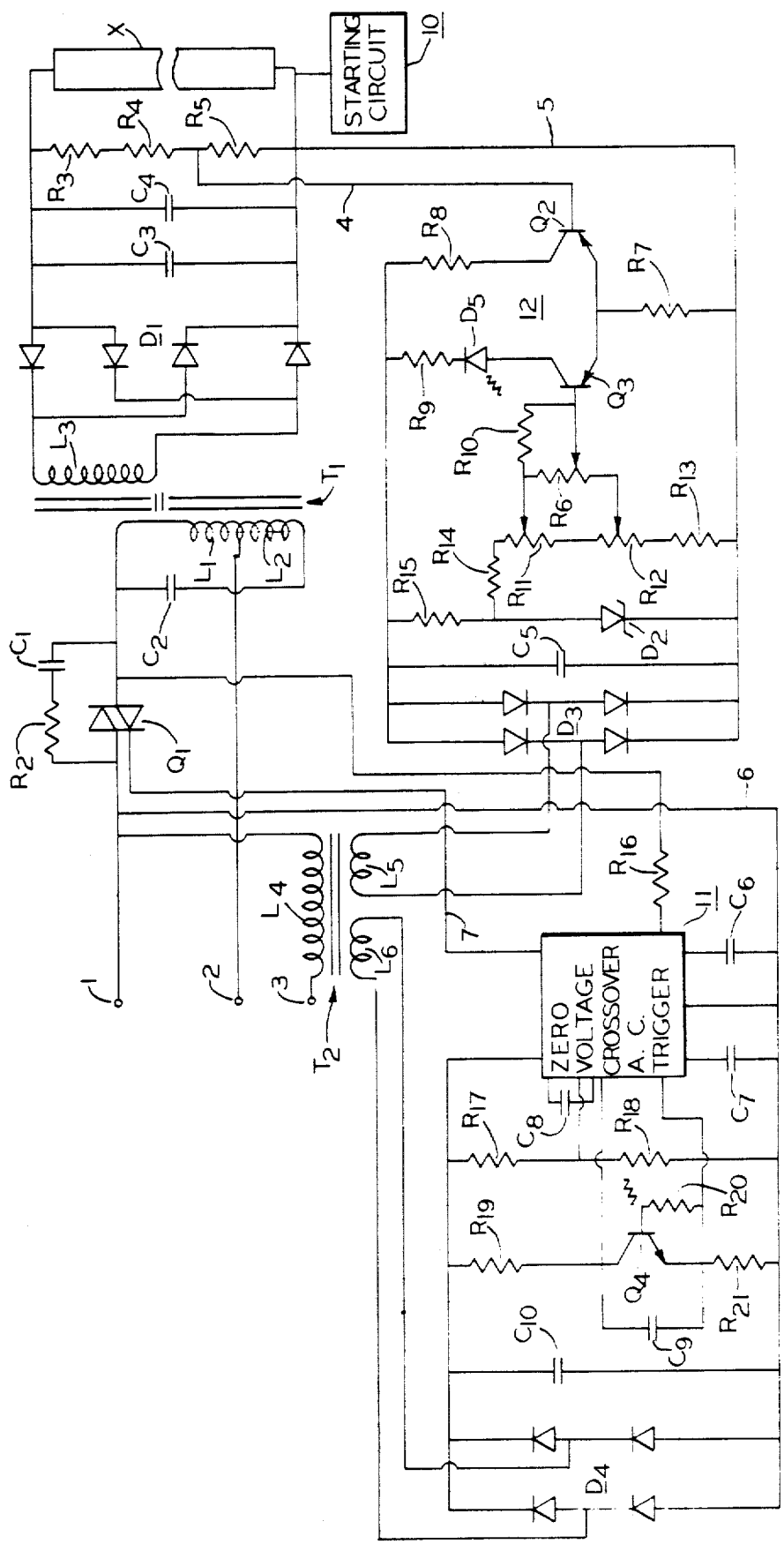

3,890,562

REGULATED POWER SUPPLY UTILIZING A HALFWAVE SWITCH

This is a continuation of application Ser. No. 305,715 filed Nov. 13, 1972 and now abandoned.

BACKGROUND OF THE INVENTION

This invention relates to an improved power supply regulation circuit. More particularly it relates to a power supply regulation circuit utilizing a halfwave switch and a zero voltage crossover trigger circuit to turn-on the switch for predetermined half cycles.

In power supply circuits utilizing a high reactance transformer and a capacitive output, the circuit is initially lagging, that is, the input current lags the input voltage at the beginning of the charge period of the output capacitance and approaches unity power factor as the capacitance reach maximum charge. Thus, this type of circuit has a varying power factor. It was desired to minimize input current in this type of power supply. One way to do this is to add leading current in the circuit such that the circuit power factor is lagging at the beginning of the charging period of the output capacitance and is leading by an equal amount at the end of the changing period. One way to accomplish this would be to add capacitance across the input, but this method was costly requiring large capacitance. Furthermore, a capacitance in conjunction with a transformer could be tied across the input in order to minimize input current. Although a smaller capacitance could be used, this method required another transformer in addition to the one present in the power supply. A switch has been placed between the input and the transformer to regulate the power supply. The switch involved could be a triac which provides bilateral current conduction and is also know as a half wave switch. In the past the gating of the triac was accomplished by the phase control method. That is, the triac was gated on at a variable portion of its voltage half cycle and then allowed to commutate off when the current went to zero. Phase control of the triac would work well only as long as the leading circuit (capacitance) was kept on the input side of the triac. It was desired, however, for economic reasons, to place the leading circuit on the transformer side of the triac. One reason was that the primary winding of a transformer, across which a capacitor could be tied, was already present in the circuit. However, it was found that phase control would not work well utilizing this type of leading circuit. Part of the problem existed because of difficulty in turning off the triac. The triac was gated on by an oscillator at a predetermined point on its voltage half cycle. Since the current was leading the voltage, it was possible that by the time that the current went through zero, the time had come for the oscillator to gate on the triac again. Thus the triac may fail to commutate off. Also, if the gating pulse was applied at another point on the half cycle the triac may not stay on for a sufficient amount of time. An approach to regulation, other than phase control, was necessary.

SUMMARY OF THE INVENTION

One of the objects of this invention is to provide an improved regulated power supply utilizing a halfwave switch in the regulation circuit.

Another object is to provide a regulated power supply which minimizes input current by providing both leading and lagging input current for approximately equal portions of the output charging cycle.

Another object of the invention is to provide an improved regulated power supply having a triac in the input circuit controlled by a zero voltage crossover AC trigger.

Another object of this invention is to provide an improved regulated power supply for regulating leading and lagging circuits which minimizes input current at a low cost.

Another object of this invention is to provide an improved regulated power supply having output capacitance which is maintained at a preselected charge level while minimizing input current.

In accordance with one form of this invention there is provided a regulated power supply having an input connected to an AC power source. A halfwave switch, which can be a thyristor, is connected to the input and has the characteristic of latching for a complete half cycle when gated on. Furthermore, the switch has a pair of conduction leads and a control lead. A transformer having primary, extension, and secondary windings is connected to the switch. A power factor improvement capacitance is connected across the primary and extension windings. This capacitance connection is important in minimizing input current. Also by connecting the capacitance across the extension and primary windings rather than merely the primary winding, a smaller capacitance and smaller sized wire may be used in the primary winding. An output circuit is connected to the secondary winding of the transformer and includes a resistance for sensing the voltage in the output circuit. In this instance a xenon flash tube, having a pair of output capacitors connected across it, is used as the output load. The voltage sensing resistance is connected to a comparator. The comparator senses the voltage present across the resistance and compares it to a variable reference voltage. The comparator is connected to a zero voltage crossover AC trigger. A second voltage senser, which is contained within the zero voltage crossover AC trigger, is connected across the switch. The trigger is connected to the control load of the switch to gate on the switch at zero voltage crossover for preselected half cycles which charges the output capacitance. The output capacitance is thus charged to a preselected level depending on the reference voltage level present on the comparator circuit and the charge is maintained by gating on the switch. A starting pulse applied by a starting circuit, which is connected to the tube, allows the output capacitance to discharge through the tube. The switch is either on for a complete half cycle or off for a complete half cycle but is never on for a portion of the half cycle as was done in the prior art phase control circuits. By using this type of switch the relationship between the switch current and the input voltage is not significant and the circuit is stable for leading and lagging power factor.

BRIEF DESCRIPTION OF THE DRAWINGS

The subject matter as which I regard as my invention is set forth more particularly in the appended claims. The invention itself, however, together with further objects and advantages thereof may be better understood by reference to the following description taken in conjunction with the accompanying drawings in which:

The FIGURE is a schematic circuit diagram of one form of the improved regulated power supply.

DESCRIPTION OF THE PREFERRED EMBODIMENT

Referring now to the FIGURE, the improved regulated power supply includes power leads 1, 2, and 3 connected to a source of AC energy. Input lead 2 is connected to one side of primary winding $L_1$ of transformer $T_1$. A halfwave switch $Q_1$, also known as a thyristor, is connected to input lead 1 and to the other side of primary winding $L_1$. In this embodiment a triac was used as switch $Q_1$. Resistor $R_2$ and capacitor $C_1$ are connected in series with each other and across triac $Q_1$ to prevent dv/dt from false triggering the triac. Step-up transformer $T_1$ is of the high leakage reactance type and comprises primary winding $L_1$, extension winding $L_2$, and secondary $L_3$ which are inductances, and a core. Capacitor $C_2$ is connected across windings $L_1$ and $L_2$ to provide input power factor improvement in order to minimize input current. Extension winding $L_2$ is closely coupled to primary winding $L_1$ while secondary winding $L_3$ is loosely coupled to primary winding $L_1$ and is connected to the output of the power supply. Full wave rectifier $D_1$ is connected to secondary winding $L_3$ and converts the stepped-up AC to pulsed DC and includes four diodes. Capacitors $C_3$ and $C_4$ are connected in parallel and across the full wave rectifier $D_1$ and provide storage change for energizing the load when the load is initiated. The load, in this case, is a xenon flash tube X connected across the capacitors $C_3$ and $C_4$. Starting circuit 10 is connected to load L to initiate it. This starting circuit may be a standard pulse starting circuit used for starting gaseous discharge lamps. Resistors $R_3$, $R_4$, and $R_5$ are connected in series with one another and in parallel to capacitors $C_3$ and $C_4$. Resistor $R_5$ is utilized as output voltage senser because the voltage across resistor $R_5$ is proportional to the total output voltage. Feedback lines 4 and 5 are connected across resistor $R_5$ and to a comparator circuit 12. The comparator circuit 12 comprises a pair of transistors $Q_2$ and $Q_3$ which have similar characteristics. The emitters of the two transistors are tied together and are both connected to feedback line 5 through resistor $R_7$ which is an emitter bias resistor. Resistor $R_8$ is connected to the collector of transistor $Q_2$ and resistor $R_9$ is connected to the collector of transistor $Q_3$ for providing current limiting to protect the respective transistors. A light emitting diode $D_5$ is connected to resistor $R_9$ and to the collector of transistor $Q_3$. The light output is proportional to the current through transistor $Q_3$ and the diode. The base of transistor $Q_2$ is connected to feedback line 4 and the base of transistor $Q_3$ is connected to the tap of potentiometer $R_6$. Potentiometer $R_6$ is also connected to the tap of potentiometer $R_{12}$. Resistor $R_{10}$ has one side connected to the base of transistor $Q_3$ and the other side is connected to potentiometer $R_6$ and to the tap of potentiometer $R_{11}$. Potentiometer $R_{12}$ is connected in series with potentiometer $R_{11}$ and resistors $R_{13}$ and $R_{14}$. This series arrangement is connected across Zener diode $D_2$. Zener diode $D_2$ is connected in series with resistor $R_{15}$, with the series circuit connected across a source of DC voltage. This combination of potentiometers or variable resistances, resistors and a Zener diode provides an adjustable reference voltage for the comparator circuit which ultimately controls the charge level of the output capacitors $C_3$ and $C_4$. When the reference voltage on the base of transistor $Q_3$ is more negative than that on the base of transistor $Q_2$ then transistor $Q_3$ will conduct. If the feedback voltage on the base of transistor $Q_2$ is more negative than the reference voltage on the base of $Q_3$ then transistor $Q_2$ will conduct. Thus, either transistor $Q_3$ or transistor $Q_2$ can be rendered conducting, depending on the magnitude of the voltages applied to their respective bases. When transistor $Q_3$ conducts diode $D_5$ will emit light. The source of DC power, which provides voltage for the comparator, comprises full wave rectifier $D_3$ having smoothing capacitor $C_5$ connected across it. The full wave rectifier $D_3$ is further connected to the source of AC energy by secondary winding $L_5$ which is a part of transformer $T_2$. Primary winding $L_4$ is connected to the source of AC voltage at terminal 3.

The light output signal from diode $D_5$ is received by light sensitive transistor $Q_4$ which is electrically isolated from the diode. This transistor-diode arrangement is housed in a common package. By using light coupling electrical isolation between the comparator circuit 12 and the trigger circuit 11 is achieved. Light sensitive transistor $Q_4$ is connected in a circuit arrangement with a zero voltage crossover AC trigger 11 and a pair of voltage dividers. Zero voltage crossover AC trigger 11 is of the type which senses the triac voltage condition and is sensitive to an external control signal of a predetermined value. When the control signal is at the predetermined value, that is, transistor $Q_4$ conducts, a triggering output pulse will occur on lead 7 when the next zero voltage condition occurs. The zero voltage crossover AC trigger 10 may be of several different types. In this embodiment, a Fairchild UA742 TRIGAC was used. A more complete description of the Fairchild UA742 TRIGAC may be found in "Application of the UA742 TRIGAC- A Zero Crossing AC Trigger" by Robert B. Hood distributed by Fairchild Semiconductor. Resistors $R_{17}$ and $R_{18}$ are connected in series and form a voltage divider. Resistors $R_{19}$, $R_{21}$, and light sensitive transistor $Q_4$ are connected in series and form another voltage divider. Transistor $Q_4$ is turned on when a sufficient amount of light is received from diode $D_5$. The above mentioned voltage dividers are connected to trigger circuit 11 at their midpoints, and provide information as to when the trigger circuit should provide a pulse on output lead 7. Resistor $R_{20}$ is connect to the base and to the emitter of transistor $Q_4$ for stabilization. Capacitors $C_9$ and $C_{10}$ are connected to the trigger circuit 11 to stabilize the trigger circuit. Capacitor $C_6$ charges when transistor $Q_4$ is conducting and discharges through lead 7 to the gate lead of triac $Q_1$ at zero voltage crossover of the triac. The trigger circuit is also connected across triac $Q_1$ through current limiting resistor $R_{16}$ and lead 6 to sense the voltage across the triac. The trigger is further connected to the gate of triac $Q_1$ through lead 7 in order to turn triac $Q_1$ on near zero voltage crossover for preselected half cycles.

DC power is provided for the voltage dividers and for the zero crossing voltage AC trigger by means of full wave rectifier bridge $D_4$ connected in parallel with capacitor $C_{10}$. Voltage for the bridge is obtained from secondary winding $L_6$ which forms part of transformer $T_2$. Secondary winding $L_6$ is coupled to primary winding $L_4$ in the transformer.

In operation, it is desired to maintain a predetermined charge on output capacitors $C_3$ and $C_4$. AC voltage is applied across terminals 1, 2 and 3. The half wave switch (triac $Q_1$) will conduct only after a gating pulse from trigger circuit 11. If the switch (triac $Q_1$) has been gated on by trigger circuit 11 current will begin to conduct through the switch near the zero voltage crossover across the switch. Transformer $T_1$ transforms the voltage to a stepped-up magnitude across secondary winding $L_3$. This voltage is then converted to pulse DC through full-wave rectifier bridge $D_1$ and stored in capacitors $C_3$ and $C_4$. As the initial charging cycle of output capacitors $C_3$ and $C_4$ takes place the input current will lag the voltage because of the loose inductive coupling between primary winding $L_1$ and secondary winding $L_3$. As the output capacitors become fully charged the input current leads the voltage because of the additional path supplied by power factor improvement capacitor $C_2$. The current then will lead by the approximate amount of its lag, thus input current is minimized.

The output voltage of the output capacitor $C_3$ and $C_4$ is sensed across resistor $R_5$ and feed to comparator circuit 12. If the voltage on the base of transistor $Q_2$ is less negative than the voltage on the base of transistor $Q_3$ then transistor $Q_3$ will conduct causing light emissive diode $D_5$ to emit light. The light is impinged upon light sensitive transistor $Q_4$ causing it to conduct through $R_{19}$ and $R_{21}$. The voltage at the junction of resistor $R_{19}$ and the collector of transistor $Q_4$ is compared to the voltage at the junction of resistors $R_{17}$ and $R_{18}$ by the trigger. When transistor $Q_4$ conducts capacitor $C_6$ charges thereby providing energy to gate triac $Q_1$ on near the beginning of the next voltage half cycle across the triac.

When it is desired to start the tube X, starting circuit 10 is initiated, which causes the gas in the tube to ionize, and capacitor $C_3$ and $C_4$ discharge through the tube giving a flash, after which the tube will extinguish. Starting circuit 10 is a standard pulse starting circuit. The starting circuit 10 provides a voltage pulse of sufficient magnitude to ionize the gas tube.

Also, since the triac is operated as a half wave switch rather than being phase controlled stable control is obtained with this leading and lagging action. Furthermore, since the transformer primary winding may be used, together with a closely coupled extension winding, in a circuit arrangment with power factor improvement capacitor $C_2$, considerable savings may be made. Capacitor $C_2$ is relatively small, and with the capacitor in parallel with the primary winding and extension winding an additional current path is provided and the wire size may be made smaller.

A circuit as set forth in FIG. 1 has been built and operated with components having the following values:

| | | |
|---|---|---|
| Resistors | $R_2$ | - 100 ohms, ½w |
| | $R_3$ | |
| | | - combined resistance 6 meg, 12w |
| | $R_4$ | |
| | $R_5$ | - 6.8k, ½w |
| | $R_6$ | - 25k, 2w potentiometer |
| | $R_7$ | - 330 ohms, ½w |
| | $R_8$ | - 1k, ½w |
| | $R_9$ | - 1k, ½w |
| | $R_{10}$ | - 47k, ½w |
| | $R_{11}$ | - 1k, 3w potentiometer |
| | $R_{12}$ | - 1k, 3w potentiometer |
| | $R_{13}$ | - 470 ohms, ½w |
| | $R_{14}$ | - 820 ohms, ½w |
| | $R_{15}$ | - 1k, ½w |
| | $R_{16}$ | - 12k, 5w |
| | $R_{17}$ | - 33k, ½w |
| | $R_{18}$ | - 33k, ½w |
| | $R_{19}$ | - 33k, ½w |
| | $R_{20}$ | - 1 meg, ½w |
| | $R_{21}$ | - 1k, ½w |

-Continued

| | | |
|---|---|---|
| Capacitors | $C_1$ | - .1 ufd, 400v |
| | $C_2$ | - 8 ufd, 550v |
| | $C_3$ | - 40 ufd, 3200v D.C. |
| | $C_4$ | - 40 ufd, 3200v D.C. |
| | $C_5$ | - 100 ufd, 50v D.C. |
| | $C_6$ | - .47 ufd, 100v |
| | $C_7$ | - .1 ufd, 100v |
| | $C_8$ | - .047 ufd, 100v |
| Capacitors | $C_9$ | - .01 ufd, 100v |
| | $C_{10}$ | - 100 ufd, 50v D.C. |
| Diodes | $D_1$ | - 6000v, 350 ma each |
| | $D_2$ | - 5.1 v, 400 mv zener |
| | $D_3$ | - 200v, 1 amp each |
| | $D_4$ | - v, 1 amp each |
| | $D_5$ | - photo diode - part of TI 111 optical isolation |
| Transformer | $T_1$ | - Primary winding $L_1$-147 turns, .0508 wire |
| | | Extension winding $L_2$-504 turns, .0285 wire |
| | | Secondary winding $L_3$-5182 turns, .0113 wire |
| Transformer | $T_2$ | - Primary winding $L_4$-573 turns, .0126 wire |
| | | Secondary winding $L_5$-120 turns, .0126 wire |
| | | Secondary winding $L_6$-120 turns, .0126 wire |
| TRIAC | $Q_1$ | - 200v, 10 amp |
| Transistors | $Q_2$ | |
| | | - Dual transistor-sprague TD-401 |
| | $Q_3$ | |
| | $Q_4$ | - photo transistor-part of TI 111 optical isolation |

From the foregoing description of the exemplification of the invention it will be apparent that many modifications may be made therein. For example the transistors $Q_3$ and $Q_4$ are shown in the exemplification of the embodiment as PNP transistors. NPN transistors may be used in their place if the appropriate bias changes are made. It will be understood, therefore, that this embodiment is intended as an exemplification of the invention only and that the invention is not limited thereto. It is to be understood, therefore, that it is intended in the appended claims to cover all such modifications as fall within the true scope of the invention.

What is claimed as new and desire to secure Letters Patent of the United States is:

1. A power supply circuit comprising:
   first and second input terminals for connecting said circuit to an AC source;
   half wave which means having a pair of conduction electrodes and a control electrode, one of said pair of conduction electrodes being connected to said first input terminal;
   gating means connected to said control electrode, said gating means including a zero voltage crossover AC trigger; said trigger including means for sensing the voltage across said half wave switch; said trigger further including means for applying a control signal to said control electrode only near zero voltage crossover for gating on said half wave switch;
   a high leakage reactance transformer having a primary winding, an extension winding and a secondary winding; one side of said primary winding being connected to the other of said pair of conduction electrodes; the other side of said primary winding being connected to said second input terminal;
   output capacitance means for providing charge storage connected to said secondary winding; said output capacitance means and said transformer drawing input current which initially is lagging and approaches unity as said output capacitance means approaches full charge;

power factor capacitance means connected across said primary winding and said extension winding, said power factor capacitance means drawing leading input current of sufficient magnitude to minimize the overall circuit input current for the total charging time of said output capacitance means, such that the overall circuit input is at times lagging and at times leading.

2. A power supply circuit as set forth in claim 1 further including comparator means having a pair of input leads and an output lead; one of said input leads being connected to said means for sensing voltage; means for connecting the other of said input leads to a reference voltage; the output lead of said comparator means being coupled to said gating means for providing a control signal to said control terminal in response to a predetermined voltage across said output capacitance means.

3. A power supply circuit as set forth in claim 1 further including means for connecting said output capacitance means to a gaseous discharge tube; and starting means connected to said output capacitance means for ionizing the gas in the tube and for discharging said output capacitance means through the tube.

4. A power supply circuit comprising:

input means for connecting said circuit to an A.C. source;

a high leakage reactance transformer having a primary winding, an extension winding, and a secondary winding; a full wave rectifier connected to said secondary winding;

at least one output capacitor connected across said full wave rectifier to provide charge storage, said at least one output capacitor and said transformer drawing input current which initially is lagging and approaches unity as said at least one output capacitor approaches full charge;

a power factor capacitor connected across said primary winding and said extension winding, said power factor capacitor drawing leading input current of sufficient magnitude to minimize the overall circuit input current for the total charging time of said at least one output capacitor, such that the overall circuit input current is at times lagging and at times leading;

means for connecting said at least one output capacitor to a xenon flash tube;

a starting circuit, means for connecting said starting circuit to the tube for applying starting pulses to the tube thereby discharging said at least output capacitor through the tube;

a sensing resistor connected to said at least one output capacitor for sensing the voltage across said at least one output capacitor;

a comparator including first and second transistors having commonly connected emitters; said sensing resistor being connected to the base of said first transistor; means providing a variable reference voltage to the base of said second transistor; a light emissive diode connected to the collector of said second transistor; means for connecting the collectors of said first and second transistors to a first DC source;

a triac having a pair of conduction leads connected between said input means and said transformer and having a gate lead;

a zero voltage crossover AC trigger circuit connected to said gate lead of said triac and adapted to apply a gating signal to said gate only near zero voltage crossover of said triac for preselected half cycles; said trigger circuit being further connected to said pair of conduction leads of said triac for sensing the voltage across said triac; first and second voltage dividers connected to said trigger; a light sensitive transistor connected in series relation with said first voltage divider and optically coupled to said light emissive diode; a gating capacitor connected to said trigger circuit for storing gating energy at a preselected time; and a second DC source connected to said first and second voltage dividers and said trigger circuit.

* * * * *